ANTI-INFLAMMATORY 4-ARYL-4-HYDROXYALLOPHANATES

Thomas R. Sharpe, 1015 Faun Road, Graylyn Crest, Wilmington, Del. 19803
No Drawing. Filed Feb. 22, 1973, Ser. No. 334,577
Int. Cl. C07c 127/18
U.S. Cl. 260—471 C    6 Claims

ABSTRACT OF THE DISCLOSURE

Certain 4-(substituted phenyl)-4-hydroxyallophanates are useful anti-inflammatory agents, which do not cause undesirable side effects. Representative 4-(substituted phenyl)-4-hydroxyallophanates within the scope of this invention include methyl 4-(4-chlorophenyl)-4-hydroxyallophanate and ethyl 4-(4-bromophenyl)-4-hydroxyallophanate.

BACKGROUND OF THE INVENTION

This invention relates to certain novel 4-aryl-4-hydroxyallophanates, to pharmaceutical compositions containing them, and to the use of said allophanates as anti-inflammatory agents.

Although many anti-inflammatory agents are known to the art, most of the prior art compounds have undesirable side effects, such as gastric irritation and other effects ranging from changes in blood cells to central nervous system changes. Adrenocortical steroids, for example, which are often used as anti-inflammatory agents, produce gastric irritation and suppression of normal adrenal function.

There is a genuine need for effective anti-inflammatory agents having fewer side effects than those presently in use; there also is a need for anti-inflammatory agents having different mode of action than those presently in use, since various inflammatory diseases, particularly arthritis, are often refractory to medication.

SUMMARY OF THE INVENTION

According to this invention, there is now provided a class of useful anti-inflammatory agents containing as the active ingredient at least one compound represented by the following formula (1):

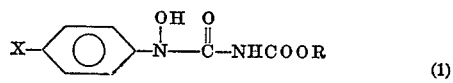

(1)

wherein

X is chlorine, bromine, trifluoromethyl or trifluoromethoxyl; and

R is methyl or ethyl.

DETAILED DESCRIPTION OF THE INVENTION

The 4-aryl-4-hydroxyallophanates of the present invention can be readily prepared by reaction of the corresponding N-arylhydroxylamines with appropriate isocyanates. This reaction is carried out in an anhydrous medium and at a low temperature, to avoid undesirable side reactions. This general type of reaction, i.e., reaction of an isocyanate with an amine, is well known in the art.

The preparation of 4-aryl-4-hydroxyallophanates of this invention is illustrated by the following equation:

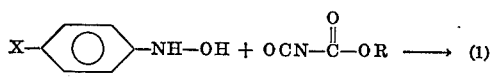

(1)

where X and R have the above-defined meaning.

The following examples describe the preparation of representative 4-aryl-4-hydroxyallophanates. All parts, proportions, and percentages are by weight unless otherwise indicated.

EXAMPLE 1

Methyl 4-(4-chlorophenyl)-4-hydroxyallophanate

A mixture of 4-chloronitrobenzene (55.3 g., 0.351 mole), ammonium chloride (21.3 g., 0.398 mole), and water (500 ml.) is heated to 75° with mechanical stirring under an atmosphere of nitrogen. Heating is discontinued while zinc dust (49.0 g., 0.712 g. atom) is added portionwise. After stirring 1½ hours at room temperature, methylene chloride (500 ml.) is added and the mixture filtered. The organic phase is separated and dried with sodium sulfate. The dried solution of N-(4-chlorophenyl)hydroxylamine is cooled in an ice bath under nitrogen, and a solution of methoxycarbonyl isocyanate (35.5 g., 0.351 mole) in methylene chloride (100 ml.) is added dropwise. After stirring in the ice bath for 45 minutes, the product is collected and washed with cold methylene chloride. There is obtained 50.0 g. of methyl 4-(4-chlorophenyl)-4-hydroxyallophanate, a nearly colorless solid, m.p. 144° (dec.). Trituration with acetone gives pure, colorless material, m.p. 160° (dec.).

EXAMPLE 2

Ethyl 4-(4-chlorophenyl)-4-hydroxyallophanate

Repeating the procedure of Example 1, but using ethoxycarbonyl isocyanate in place of methoxycarbonyl isocyanate, gives ethyl 4-(4-chlorophenyl)-4-hydroxyallophanate, m.p. 154° (dec.).

EXAMPLE 3

Ethyl 4-(4-bromophenyl)-4-hydroxyallophanate

A mixture of 4-bromonitrobenzene (20.2 g., 0.100 mole), ammonium chloride (6.1 g.), zinc dust (13.1 g., 0.200 g. atom), ethanol (140 ml.), and water (60 ml.) is heated to 65°. The mixture is then stirred for 2 hours without heating. The solid is filtered off, and the filtrate is evaporated to dryness under reduced pressure. The residue is dissolved in methylene chloride and dried with sodium sulfate. To this dried solution cooled in an ice bath is added dropwise ethoxycarbonyl isocyanate (8.6 g., 0.075 mole) in methylene chloride (25 ml.). The colorless solid is collected by filtration. There is obtained 14.8 g. of ethyl 4-(4-bromophenyl)-4-hydroxyallophanate, m.p. 157° (dec.).

By substituting methoxycarbonyl isocyanate for the ethoxycarbonyl isocyanate of this Example, one can obtain methyl 4-(4-bromophenyl)-4-hydroxyallophanate.

EXAMPLE 4

Ethyl 4-(4-trifluoromethoxyphenyl)-4-hydroxyallophanate

To a stirred mixture of 4-trifluoromethoxynitrobenzene (18.7 g., 0.0903 mole), ammonium chloride (5.5 g.), and 70% ethanol (200 ml.) is added zinc dust (11.8 g., 0.180 g. atom). Stirring is continued for one hour at room temperature. The solid is filtered off and washed with hot ethanol. The filtrate is evaporated under reduced pressure, and the residue is dissolved in methylene chloride and dried with sodium sulfate. To this dried solution cooled in an ice bath is added ethoxycarbonyl isocyanate (8.0 g., 0.075 mole) in methylene chloride (25 ml.). After stirring for 2 hours in the ice bath, the solid is collected and washed with cold methylene chloride. There is obtained 15.0 g. of ethyl 4-(4-trifluoromethoxyphenyl)-4-hydroxyallophanate, m.p. 165.5° (dec.).

By substituting methoxycarbonyl isocyanate for the ethoxycarbonyl isocyanate of this Example, one can obtain methyl 4-(4-trifluoromethoxyphenyl) - 4 - hydroxyallophanate.

EXAMPLE 5

Ethyl 4-(4-trifluoromethylphenyl)-4-hydroxyallophanate

Using 4-trifluoromethylnitrobenzene in place of the 4-trifluoromethoxynitrobenzene of Example 4 gives nearly colorless ethyl 4-(4-trifluoromethylphenyl) - 4 - hydroxyallophanate, m.p. 177.5° (dec.). Recrystallization from ethanol gives colorless material, m.p. 179° (dec.).

By substituting methoxycarbonyl isocyanate for the ethoxycarbonyl isocyanate and using 4-trifluoromethylnitrobenzene in place of the 4-trifluoromethoxynitrobenzene of Example 4, one can obtain methyl 4-(4-trifluoromethylphenyl)-4-hydroxyallophanate.

The compounds of the present invention are suitable in many inflammatory conditions of the body. Inflammation is a disease process characterized by redness, fever, swelling and pain; arthritis in its various forms is the most prevalent, chronic, and severe of the inflammatory diseases. Traumatic injury and infection also involve inflammation, and anti-inflammatory drugs are often used in their treatment. The compounds of the present invention offer a marked advantage over many currently used anti-inflammatory agents since the compounds of the present invention do not cause as many or as severe undesirable side effects as the current products.

The anti-inflammatory activity of the compounds of the present invention was demonstrated in the following test:

Male, CFE rats, weighing 150–200 grams were injected subcutaneously with 0.1 ml. of a suspension of *Myobacterium butyricum* (Difco heat-killed, lyophilized cells) in mineral oil (5 mg./ml.) into the plantar area of the right hind paw. Mineral oil injected rats served as non-arthritic controls.

A period of 14 days was allowed for the arthritic process to develop maximally. The volume of the left hind paw (uninjected) of each rat was then measured by mercury displacement. The animals were rearranged into balanced groups of 10 (according to the degree of arthritic disease as indicated by paw size).

Drug treatment was begun on day 14, after the paw volume measurement and was continued for 7 days. Drugs were intubated once daily in 1 ml. per 100 grams of body weight of PVA-Acacia medium (polyvinyl alcohol 1%, gum acacia 5%, and methylparaben 0.5%). Paw volumes were measured again 24 hours after the last dose.

The paw volume measurement was recorded as the meter reading from a transducer-indicator that expressed proportionately the effect of mercury displacement on a suitably oriented strain gauge. The system was calibrated with a metal rod of known value. The conversion of the mean meter reading to ml. was obtained from a standard curve.

Increase in the paw volume of the uninjected hind paw is proportional to the development of arthritis in adjuvant-injected rats. Inhibition of paw volume increase in drug treated rats is indicative of antiarthritic activity.

The compounds were tested at three or more dose levels. Dose-response curves were constructed for percent inhibition of the treated group mean paw volumes increases as compared to control group mean paw volume increase. The dose (mg./kg.) required to produce 50% inhibition of the mean paw volume increase (ED 50%) was determined from the dose response curve.

The results of the test are presented in the following Table:

ANTI-INFLAMMATORY ACTIVITY ESTABLISHED ADJUVANT-INDUCED ARTHRITIS IN RATS

| Control | Daily oral dose (mg./kg.) | | Paw volume (ml.) | | Percent decrease from control | | ED 50%) decrease from control paw volume (mg./kg.) |
|---|---|---|---|---|---|---|---|
| | Test #1 | Test #2 | Test #1 | Test #2 | Test #1 | Test #2 | |
| Methyl 4-(4-chlorophenyl)-4-hydroxyallophanate | ¹0<br>2.5<br>5<br>10<br>20<br>40 | ¹0<br>5<br>10<br>20<br>40 | 2.83<br>2.78<br>2.60<br>2.33<br>2.44<br>2.12 | 2.65<br>2.28<br>2.26<br>2.03<br>2.16 | 5<br>22<br>46<br>36<br>66 | 40<br>42<br>67<br>53 | 20 |
| Ethyl 4-(4-chlorophenyl)-4-hydroxyallophanate | ¹0<br>10<br>20<br>40<br>80 | | 2.57<br>2.33<br>2.47<br>2.17<br>1.93 | | 35<br>14<br>58<br>93 | | 20 |
| Ethyl 4-(4-bromophenyl)-4-hydroxyallophanate | ¹0<br>20<br>40<br>80 | | 2.77<br>2.36<br>2.21<br>1.88 | | 42<br>58<br>92 | | 28 |
| Ethyl 4-(4-trifluoromethylphenyl)-4-hydroxyallophanate | ¹0<br>12.5<br>25<br>50 | | 2.81<br>2.65<br>2.18<br>2.22 | | 17<br>68<br>63 | | 27 |
| Ethyl 4-(4-trifluoromethoxyphenyl)-4-hydroxyallophanate | ¹0<br>20<br>40<br>80 | | 2.77<br>2.52<br>2.31<br>2.19 | | 26<br>46<br>60 | | 50 |

¹ Control.

The compounds of this invention may be employed in pharmaceutical compositions such as injectables and oral dosage forms, for example, tablets, hard gelatin capsules, soft gelatin capsules, oral suspensions, syrups and elixirs. In solid, oral dosage forms, the active ingredient will ordinarily be present in an amount of at least 0.5% by weight based on the total weight of the composition and not more than 95% by weight.

The dosage administered will be dependent upon the age, health and weight of the recipient, the extent of the disease, kind of concurrent treatment, if any, frequency of treatment and the nature of the effect desired. Usually a daily dosage of active ingredient compound will be from about 0.2 to 100 milligrams per kilogram of body weight. Ordinarily from 1 to 32 and preferably 2 to 8 milligrams per kilogram per day in one or more applications per day is effective to obtain desired results.

Besides the active ingredient compound of this invention, the composition will contain a solid or liquid non-toxic pharmaceutical carrier for the active ingredient and may also contain other additives such as lubricants, binding agents, disintegrants, preservatives, colorants and flavors, which are common to the art.

In one embodiment of a pharmaceutical composition of this invention, the dosage form is a capsule which can be of the ordinary gelatin type. In the capsules will be from about 5 to 95% by weight of a compound of the invention and 95 to 5% of a carrier. In another embodiment, the active ingredient is tableted with a suitable diluent.

These capsules and tablets will usually constitute from about 1% to about 95% and preferably from 5% to 90% by weight of active ingredient. These dosage forms preferably contain from about 5 to about 500 milligrams of active ingredient, about 5 to about 100 milligrams being particularly preferred.

In order to obtain high blood levels the compounds of this invention may be micronized prior to use in the pharmaceutical dosage form.

The pharmaceutical carrier can be a sterile liquid such as water or an oil, including those of petroleum, animal, vegetable oils of synthetic origin, for example peanut oil, soybean oil, mineral oil, seame oil and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.5% to 25% and preferably about 1 to 10% by weight of the active ingredient.

Liquid oral administration can be in a suitable suspension, syrup or elixir, in which the active ingredient ordinarily will constitute from about 0.5 to 10% and preferably about 1 to 5% by weight. The pharmaceutical carrier in such composition can be a watery vehicle such as an aromatic water, a syrup, a pharmaceutical mucilage, or a hydro-alcoholic elixir.

Suitable pharmaceutical carriers, diluents and additives are described in "Remington's Pharmaceutical Sciences" by E. W. Martin, a well-known reference text in this field.

The following examples will further illustrate the preparation of pharmaceutical compositions of the invention.

EXAMPLE 6

A large number of unit capsules are prepared by filling standard two-piece hard gelatin capsules each with 150 milligrams of micronized methyl 4-(4-chlorophenyl)-4-hydroxyallophanate, 300 milligrams of lactose, 32 milligrams of talc and 8 milligrams of magnesium stearate.

EXAMPLE 7

A mixture of ethyl 4-(4-chlorophenyl)-4-hydroxyallophanate in soybean oil is prepared and injected by means of a positive displacement pump into gelatin to form soft gelatin capsules containing 100 milligrams of the active ingredient. The capsules are washed in petroleum ether and dried.

EXAMPLE 8

A large number of tablets are prepared by conventional procedures so that the dosage unit is 250 milligrams of micronized methyl 4 - (4-chlorophenyl)-4-hydroxyallophanate, 7 milligrams of ethyl cellulose, 0.2 milligram of colloidal silicon dioxide, 7 milligrams of magnesium stearate, 11 milligrams of microcrystalline cellulose, 11 milligrams of cornstarch and 298.8 milligrams of lactose. Appropriate coatings may be applied to increase palatability or delay absorption.

EXAMPLE 9

An aqueous suspension is prepared for oral administration so that each 5 milliliters contain 50 milligrams of finely divided ethyl 4 - (4-chlorophenyl)-4-hydroxyallophanate, 500 milligrams of acacia, 5 milligrams of sodium benzoate, 1.0 gram of sorbitol solution, U.S.P., 5 milligrams of sodium saccharin and 0.025 milliliters of vanilla tincture.

EXAMPLE 10

A parenteral composition suitable for administration by injection is prepared by stirring 1.5% by weight of ethyl 4 - (4 - trifluoromethylphenyl)-4-hydroxyallophanate in 20% by volume propylene glycol in water. The solution is sterilized by heat or filtration.

A wide variety of compositions coming within this invention can be prepared by substituting other compounds of this invention, including specifically but not limited to those compounds named hereinbefore, for the compounds named in the Examples above and substituting other suitable pharmaceutical carriers well known and described in the Martin text mentioned above.

I claim:

1. A 4-aryl-4-hydroxyallophanate having the following formula

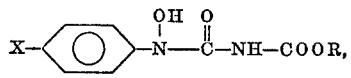

wherein
X is chlorine, bromine, trifluoromethyl, or trifluoromethoxyl; and
R is methyl or ethyl.

2. Methyl 4 - (4-chlorophenyl)-4-hydroxyallophanate, the compound of claim 1 wherein X is chlorine and R is methyl.

3. Ethyl 4-(4-chlorophenyl)-4-hydroxyallophanate, the compound of claim 1 wherein X is chlorine and R is ethyl.

4. Ethyl 4-(4-bromophenyl)-4-hydroxyallophanate, the compound of claim 1 wherein X is bromine and R is ethyl.

5. Ethyl 4 - (4-trifluoromethylphenyl)-4-hydroxyallophanate, the compound of claim 1 wherein X is trifluoromethyl and R is ethyl.

6. Ethyl 4-(4 - trifluoromethoxyphenyl)-4-hydroxyallophanate, the compound of claim 1 wherein X is trifluoromethoxyl and R is ethyl.

References Cited

UNITED STATES PATENTS 3,705,173  12/1972  Adams et al. _____ 260—471 C

LORRAINE A. WEINBERGER, Primary Examiner
L. A. THAXTON, Assistant Examiner

U.S. Cl. X.R.
424—300

UNITED STATES PATENT OFFICE
CERTIFICATE OF CORRECTION

Patent No. 3,819,681　　　　　　　　　Dated June 25, 1974

Inventor(s) Thomas R. Sharpe

It is certified that error appears in the above-identified patent and that said Letters Patent are hereby corrected as shown below:

In the patent at column 1, line 4, after "Thomas R. Sharpe, 1015 Faun Road, Graylyn Crest, Wilmington, Del. 19803," insert -- assignor to E. I. du Pont de Nemours and Company, Wilmington, Delaware, a corporation of Delaware."

Signed and sealed this 21st day of January 1975.

(SEAL)
Attest:

McCOY M. GIBSON JR.
Attesting Officer

C. MARSHALL DANN
Commissioner of Patents